Dec. 28, 1926.
L. C. MARSHALL
1,612,139
APPARATUS FOR MAKING TEMPLATES
Filed Oct. 29, 1921 3 Sheets-Sheet 1
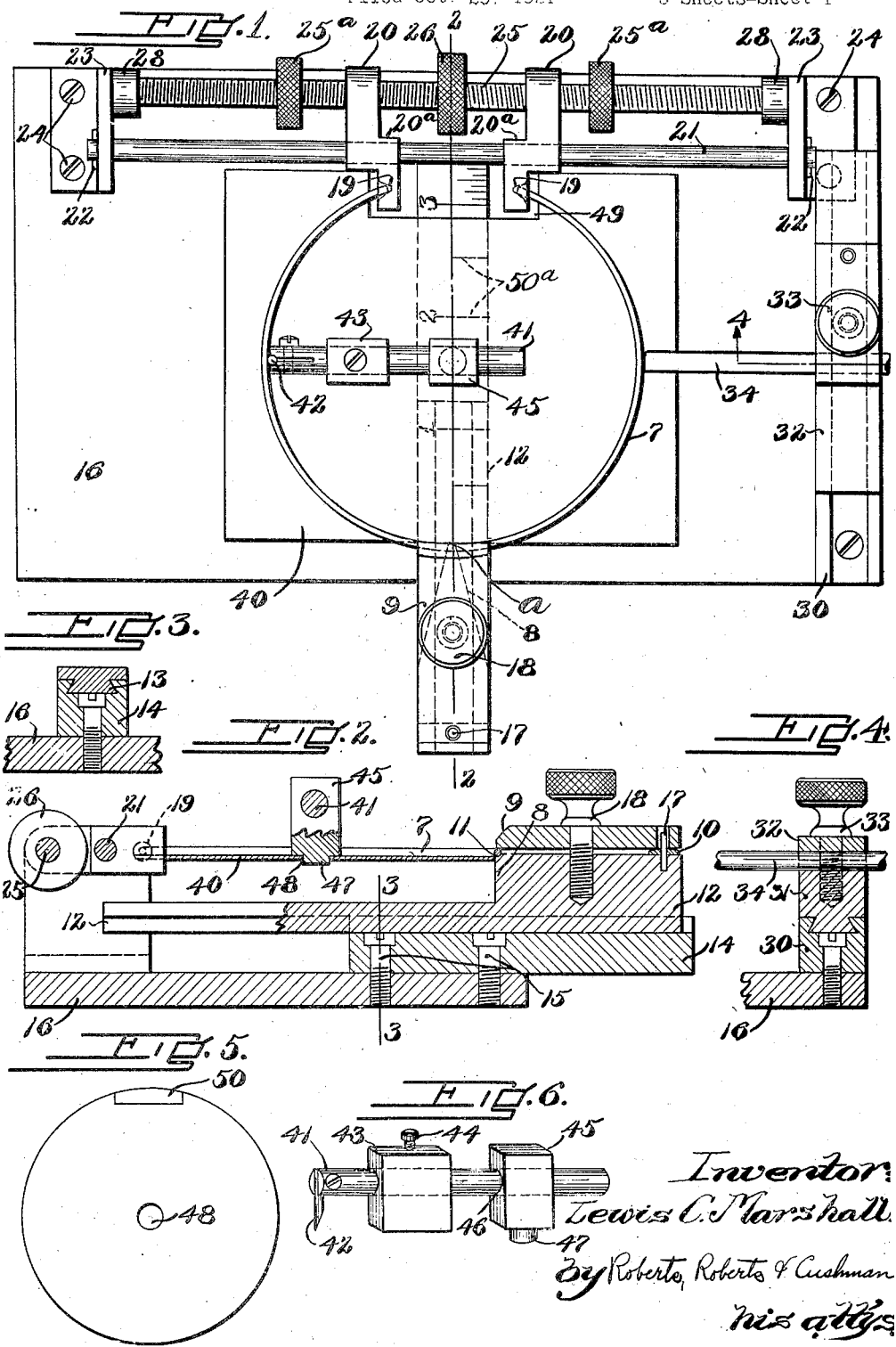

Dec. 28, 1926. 1,612,139
L. C. MARSHALL
APPARATUS FOR MAKING TEMPLATES
Filed Oct. 29, 1921  3 Sheets-Sheet 2
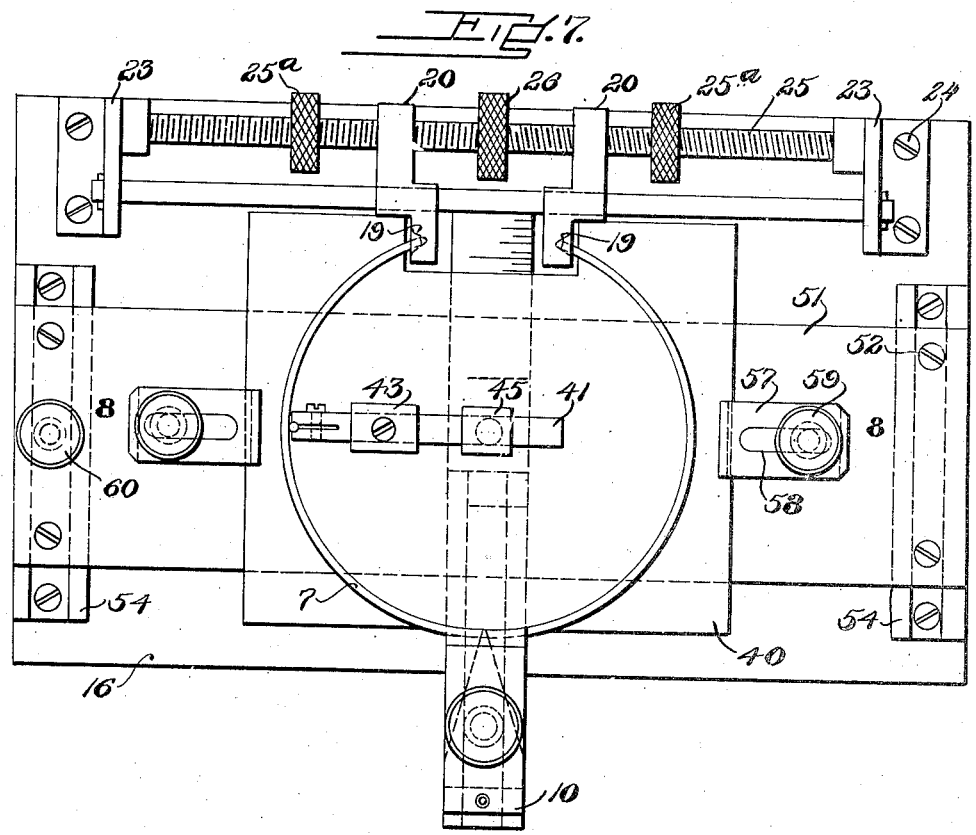
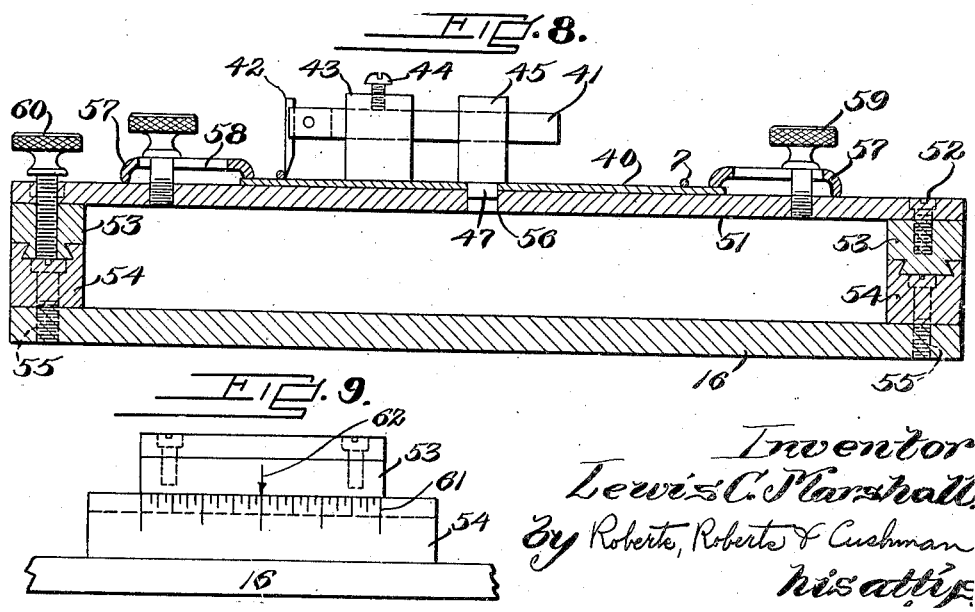
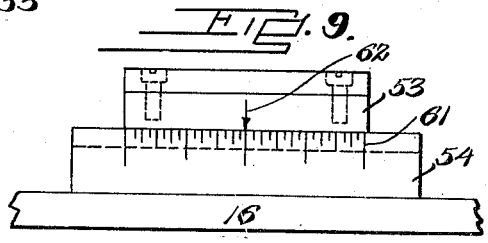

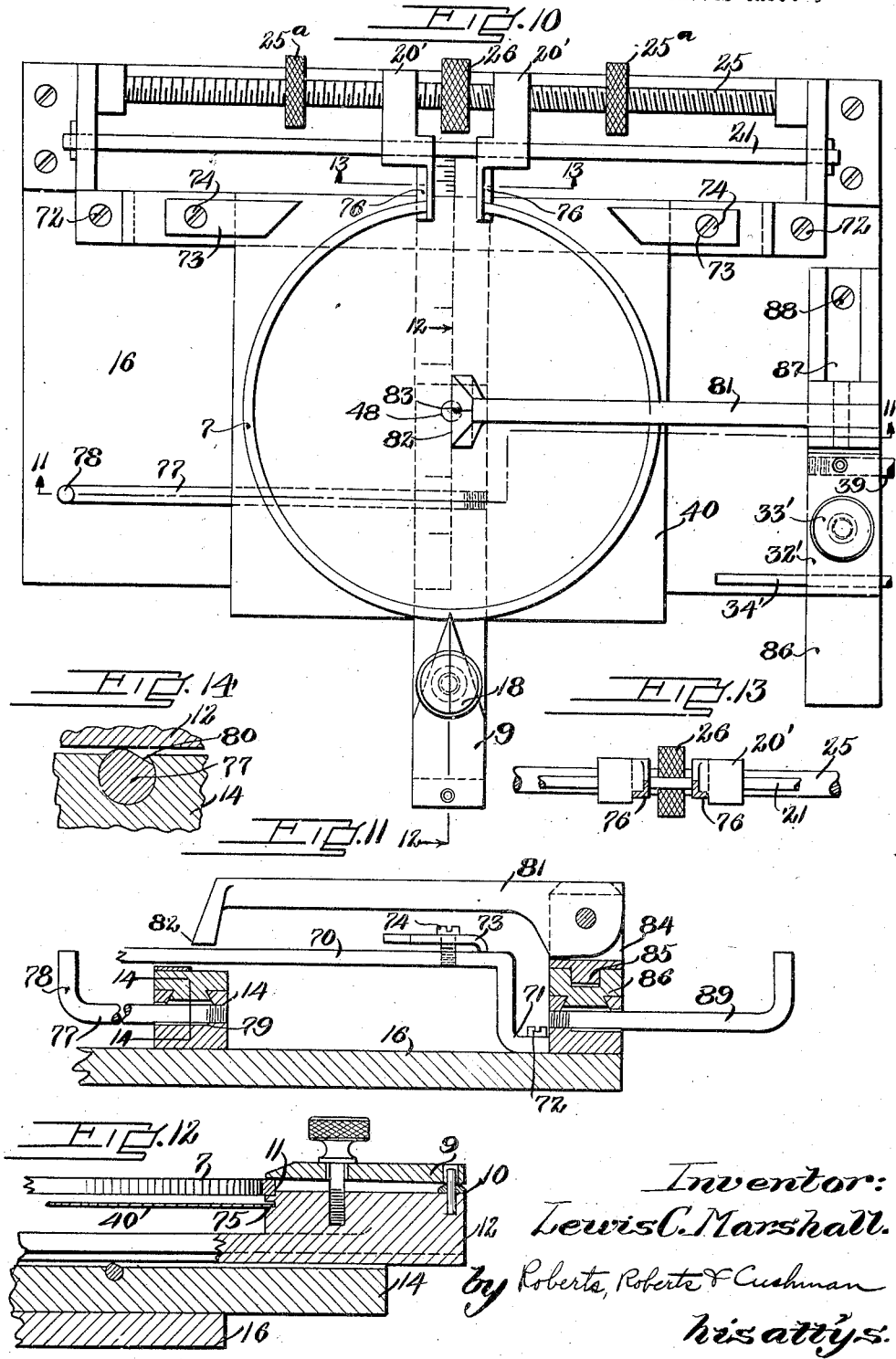

Patented Dec. 28, 1926.

1,612,139

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

APPARATUS FOR MAKING TEMPLATES.

Application filed October 29, 1921. Serial No. 511,346.

This invention relates to means for making templates, and in particular for making templates which reproduce non-circular contours, as of an expanded ring in the manufacture of piston packings.

In making piston rings and piston ring followers, for example, it is desirable to produce an open ring having such contour that when compressed into position it is exactly circular and exerts a radial pressure substantially uniform throughout the periphery thereof.

The preferred way of making piston ring followers is to construct a mandrel which is more or less elliptical in cross-section and which has the exact transverse contour that the finished ring should have, and to wrap wire spirally therearound, after which the wire is tempered while still on the mandrel. After the wire is removed from the mandrel sections are cut out on the proper side so as to form a plurality of open rings of such contour that when compressed to their normal size in the piston they are exactly circular and exert uniform radial pressure throughout their entire periphery.

To determine the proper shape of the mandrel by a cut and try process is extremely slow and expensive, especially in view of the fact that there is a different contour for every ring size and for every ring pressure.

The object of the present invention is quickly and accurately to make a template of the desired contour of the rings before being compressed. From this template cams are made of similar contour for use in turning the aforesaid mandrels. A further object is to determine the exact or symmetrical center of the expanded ring and of the template made therefrom.

According to the present invention an open circular ring of the diameter of the finished ring when compressed is held symmetrical about a diametrical plane bisecting its gap while being expanded. The ring is preferably held in this symmetrical position by means of a clamp at a point diametrically opposite the gap and the ends of the ring are moved away from each other equidistantly from the diametrical plane bisecting the gap to an extent depending upon the radial force which the finished ring is to exert. The clamp which holds the ring opposite the gap preferably clamps the ring on a knife edge or at least on a very narrow jaw, but one side of the clamp is preferably wider so as to prevent the ring from tipping relative to its normal plane. After the ring is expanded an amount which, by calculation or prior tests, will have the contour of the finished ring which when compressed into circular form will give the desired radial pressure, the inside contour is traced on a plate and the template is cut along this tracing. The invention further comprises a method and means for locating the exact or symmetrical center of the expanded ring which includes fixing the exact center of the ring before it is expanded and then expanding the ring uniformly about said center. The preferred means comprises a member pivoted to a slide and so disposed as to be swung out of the way after the center of the ring is located and back again when desired to indicate the center of the expanded ring and of the template to correspond thereto.

By expanding the ring in this fashion, the portion of the ring on opposite sides of the diametrical plane bisecting the gap will flex substantially identically so that the finished template will be substantially symmetrical about the said plane. The extent of expansion is preferably determined by measuring the inside diameter perpendicular to the aforesaid bisecting plane. The aforesaid clamp is free to move radially of the ring and as the ring is expanded it is moved outwardly somewhat by the expansion of the ring.

In order to illustrate the invention, one concrete embodiment thereof is shown in the accompanying drawings in which:—

Fig. 1 is a plan view;

Fig. 2 is a vertical section on the line 2—2 of Fig. 1;

Fig. 3 is a section on line 3—3 of Fig. 2;

Fig. 4 is a section on the line 4—4 of Fig. 1;

Fig. 5 is a plan view of a completed template;

Fig. 6 is a perspective view of the tracer;

Fig. 7 is a plan view of a modification of the device;

Fig. 8 is a sectional view longitudinally of Fig. 7, showing the tracer in elevation and omitting certain parts shown in Fig. 2;

Fig. 9 is an end elevational view;

Fig. 10 is a plan view of still another modification;

Fig. 11 is a section on line 11—11 of Fig. 10;

Fig. 12 is a section on line 12—12 of Fig. 10;

Fig. 13 is a section on line 13—13 of Fig. 10; and

Fig. 14 is a detailed sectional view on line 14—14 of Fig. 11.

An open circular ring 7 of the diameter which the finished rings or followers are to have when compressed is received at a point $a$ in the plane bisecting the opening or gap of the ring by jaws 8 and 9 of clamp 10. The lower jaw 8, as indicated by dotted lines in Fig. 1, terminates in a narrow edge and receives the ring 7 in a shallow recess 11 (Fig. 2). Jaw 9 is relatively wide and curved in outline to fit across a sufficient portion of the ring to prevent the ring from tipping. Jaw 8 is integral with an elongated slide 12 having a dove-tail connection 13 with guide block 14 attached by screws 15 to a base 16. Jaw 9 of the clamp has an opening loosely receiving pin 17 fastened in slide 12 and is pressed into clamping relation with the lower jaw 8 by means of screw 18 having a knurled top.

The means for distorting ring 7 by separating its ends sufficiently to give the desired radial pressure in the finished rings or followers comprises blocks 20 sliding on rod 21 held by cotter pins 22 on its extreme ends in angular brackets 23, the horizontal portions of the brackets being fastened to base 16 by screws 24. Blocks 20 are normally in contact with each other, the line of contact being diametrically opposite the knife edge of jaw 8 of the clamp 10 and are adapted to be moved apart to spread ring 7, the ends of which are received in conical recesses 19. The recesses 19 are preferably tapered so that the extreme ends of the ring have no lateral play while at the same time the portions of the ring within the recesses do not engage the mouth of the recess when they flex slightly during the expansion of the ring. Any suitable means for simultaneously separating the blocks 20 at equal rates may be used, the preferred means comprising a shaft 25 oppositely threaded on each side of a centrally disposed knurled collar 26 integral with the shaft for manually operating the same. Blocks 20 are recessed at the rear as indicated at 20ª to receive collar 26 when the blocks are in contact and have threaded openings receiving shaft 25 which is rotatable in bearings in brackets 23, thrust collars 28 being disposed at either end of shaft 25 adjacent brackets 23. Blocks 20 may be locked in adjusted position by lock nuts 25ª.

Disposed in parallel relation to guide block 14 is a similar guide block 30 having a dove-tail connection with a slide 31 which has a movable clamping member 32, similar to jaw 9 of the ring clamp, actuated by screw 33. Slidable between jaw 32 and slide 31 is a transversely disposed rod 34, the purpose of which will be hereinafter set forth.

The tracer for drawing the outline of the inner periphery of ring 7 upon template stock such as the template plate 40 (Fig. 1) comprises a rod 41 having a tracer point 42, a slide 43 adjustably held upon rod 41 by clamping screw 44 and a pivoting member 45 slidably receiving rod 41 in opening 46 and having a pivot lug 47 on the bottom. In preparing a piece of template stock such as 40 (Fig. 1) a hole 48 is punched in the same at approximately the center to receive pivot lug 47 of the tracer and one end is slotted or recessed as at 49 to receive the projecting ends of blocks 20 as indicated in Fig. 1.

The operation of the device is as follows: After the ring 7 is properly centered by the aid of graduations 50ª on slide 12 and is clamped at point $a$ between jaws 8 and 9, its free ends are separated the required distance by operating knurled collar 26 on shaft 25. A suitable piece of template stock 40 is then held beneath ring 7 with one edge in contact with jaw 8 and recess 49 receiving the projecting ends of blocks 20. The tracer is then placed upon the template stock 40 with lug 47 in hole 48 and the operator traces the inner periphery of ring 7 which, being non-circular, makes the sliding engagement of arm 41 in the pivot block 45 imperative. When the outline has been traced, the template plate is removed and cut along the line of the tracing and a piece 50 is inserted to fill the slot 49. The template in its finished form is shown in Fig. 5 and is now ready for use in making the cam for the mandrel used in making packing rings or followers.

The extent of expansion of ring 7 is preferably determined by measuring the diameter perpendicular to the diametrical bisector of the opening between the ends. To facilitate taking this measurement accurately from time to time in order that the distortion of the ring may be stopped at the proper point, rod 34, movable in two dimensions in the plane of ring 7, is provided. As shown in Fig. 1, this rod is moved into tangential contact with ring 7, graduations 50ª on slide 12 assisting in properly positioning the rod. A gage is then placed diametrically across ring 7 with one end thereof abutting the inside of the ring opposite rod 34, and the measurement is easily and accurately obtained.

The modified form of the device disclosed in Figs. 7, 8 and 9 provides a positive support for the template stock. The preferred form of supporting means for the template stock comprises a plate 51 fixedly attached at either end by screws 52 to slides 53 having dove-tail connections with guide blocks 54 parallelly disposed in relation to central guide block 14 and fastened to base 16 by screws 55. Disposed centrally of the plate in the plane passing through the knife edge of clamp 10 and perpendicular to shaft 25 is a pivot hole 56 adapted to receive the pivot lug 47 of the tracer. Arranged at either side of the plate 51 are clamping means for the template stock 40 comprising clamp plates 57 each having a longitudinal slot 58 through which passes clamping screw 59 received in a threaded opening in plate 51. One of the slides 53 has a clamping screw 60 passing through an opening in plate 50 and adapted to press against the upper face of guide block 54 to clamp block 53 and plate 51 attached thereto against movement. One of the guide blocks 54, preferably the one acted upon by the clamping screw 60, is graduated as indicated at 61 and corresponding slide 53 has a notch or pointer 62 thereon corresponding with the exact center of pivot opening 56 in plate 51.

In using the modified device the plate 51 is first clamped in position so that pivot point 56 is at the exact center of the ring 7 before being expanded. This is determined by means of the graduations 61 which are calibrated to indicate the centers of rings of different diameters; for example, in expanding a three-inch ring, pointer 62 will be positioned at a point 1½ inches from a line tangent to the inner periphery of the lower (Fig. 7) side of the unexpanded ring. When the ring is expanded the pivot opening 56 thus located continues to define the center of the expanded ring. Plate 51 is so arranged that when a piece of prepared template stock 40 is placed thereon it is directly beneath ring 7. Clamps 57 in combination with pivot opening 56 which receives pivot lug 47 hold the template stock securely against movement and the operator is free to give his entire attention to make an accurate tracing of the inner periphery of the ring 7.

In Fig. 10 a modified form of support for template plate 40 is shown comprising a U-shaped support 70 having flanges 71 on the ends of the parallel portion attached to base 16 by means of screws 72. Clamping plates 73 operated by screws 74 are disposed upon the upper side of supports 70 to immovably hold one end of template plate 40. The opposite end of the plate is received in a slit 75 in the lower jaw of clamp 10 directly below recess 11 for ring 7. In order to make it unnecessary to slot the template plate 40 as shown at 49 in Fig. 1, a modified form of spreader blocks 20' is used comprising projections 76 having portions disposed at right angles to each other as indicated in section in Fig. 13 wherein projections 76 are shown as not extending to the depth of the blocks 20' whereby template plate 40 may be received thereunder and rest upon support 70. The free ends of ring 7 rest upon the horizontal portions of projections 76 and press against the upright portions thereof the frictional engagement of the ends being sufficient to prevent the latter from slipping. Means are provided for locking slide 12 in place after the ring has been expanded, comprising rod 77 having an upturned end 78 serving as a handle and received as to its opposite end in circular opening 79 in block 14 with which rod 77 has threaded connection. Opening 79 is so disposed as to cause rod 77 to project into the dove-tail slot in block 14 as indicated in Fig. 14. A portion of rod 77 is planed off as indicated at 80 so that when the handle 78 is in upright position as shown in Fig. 11, slide 12 can be moved, but when handle 79 is rotated in either direction slide 12 is locked against movement in an obvious manner.

In order accurately to indicate the center of ring 7, arm or gage member 81 is provided having a straight edge 82 with a check or indicator mark 83 thereon. Straight edge 82 is directly above the perpendicular bisector of the opening in the ring, when the latter is properly supported by blocks 20' and clamp 10. Arm 81 is pivoted for vertical swinging movement to a block 84 having a tongue 85 fitting into a corresponding depression in slide 86 which has a dove-tailed connection with block 87 attached by screws 88 to base 16 and disposed in parallelism to guide block 14. Slide 86 has a jaw 32' operated by screw 33' for adjustably clamping rod 34', the three parts last mentioned being similar to correspondingly numbered parts in Figs. 1 and 4 and similarly used. A locking rod 89, similar to locking rod 77, is provided for selectively holding slide 86 against movement.

In using the modification disclosed in Figs. 10 to 14, inclusive, the operator has the choice of inserting template plate 40 either before or after ring 7 has expanded. In either case, arm 81 is rotated to the position indicated in Fig. 11 and then moved back and forth by operating slide 85 until the check mark 83 indicates the exact center of ring 71 before it is expanded. Template plate 40 is inserted with one end supported by slot 75 in the lower jaw of clamp 10 and the other resting upon support 70. Plate 40 is moved until hole 48 therein is centrally disposed relatively to the ring by the help of the check mark 83 on arm 81. Clamps 73 are then operated to hold the plate firmly in position. The ring is now expanded in the usual manner, groove 75 being deep enough to permit outward movement of clamp 10 without permitting plate 40 to drop. The inner periphery of the ring is then traced upon template plate 40, arm 81 having meanwhile been rotated out of the way.

If it is desired to insert template plate 40 after the ring has been expanded, the center of the ring before expansion is found and indicated by arm 81 in the manner just described. Slide 86 is then locked in position by operating rod 89. Arm 81 is rotated out of the way, the ring is expanded in the usual manner and template plate 40 is inserted in the manner above described. In order to properly position hole 48, arm 81 is rotated over ring 7 and check mark 83, together with the straight edge 82 is used to locate hole 48 at the exact center of the ring. Thereupon the template plate 40 is clamped in place and the outline of the ring is traced. Whenever a locking device such as rod 77 is provided slide 12 is locked against movement after the ring has been expanded and before the tracing is made.

The location of the center of ring 7 after it is expanded is of great importance when using the finished template as a pattern for the cam from which the mandrel is fashioned in making piston rings and followers; and the above described arrangement accords accurate and convenient means for invariably producing the proper relationship between the opening in the template and the outline thereof.

In order to secure the contour necessary to produce uniform pressure of the desired amount by the finished piston ring or follower it is important to employ, in making the template, a ring of the same size, cross-section and composition as the finished product. For example, in making a piston ring follower of circular cross-section I preferably use a ring of circular cross-section, of the same gauge, composition, temper, etc., as the finished follower is to have. In this way the template contour conforms exactly to that of the finished ring or follower which when compressed to the required diameter will be exactly circular and will exert uniform radial pressure throughout its periphery.

By reason of its many adjustments the device herein disclosed is adapted for use in making templates quickly and accurately for packings for all sizes of pistons.

I claim:—

1. Apparatus for distorting a split ring comprising a narrow support, means for holding a portion of the ring against said support, and means for separating the ends of the ring symmetrically with respect to said portion of the ring.

2. Apparatus for distorting a split ring comprising a clamp having a narrow jaw, means for holding a portion of the ring diametrically opposite the opening in the ring against said jaw, and means for engaging and separating the ends of said ring.

3. Apparatus for distorting a split ring comprising a clamp having relatively movable jaws, one of said jaws having a narrow edge for engagement with the ring at a point diametrically opposite the opening therein, means for separating the ends of the ring and a base, said clamp being mounted upon said base and freely movable radially of the ring as thus positioned.

4. Apparatus for distorting a split ring comprising a clamp comprising a narrow edged jaw and means for holding a portion of the ring against said narrow edged jaw, at a point diametrically opposite the opening therein, means for separating the ends of the ring and a base, said clamp being mounted upon said base and freely movable radially of the ring, and means for locking said clamp against movement.

5. Apparatus for distorting a split ring comprising a clamp having a narrow jaw and a broad jaw cooperating therewith for holding the ring against tipping, while clamping it against the narrow jaw, and means for engaging the ends of the ring and for moving them, severally, a predetermined distance apart.

6. Apparatus for distorting a split ring comprising a clamp having a jaw provided with a narrow edge for engaging a portion of a ring and a jaw provided with a portion substantially wider than said narrow edge for pressing the ring against the narrow edge of the first jaw while preventing its tipping about such narrow edge, and means diametrically opposite said clamp for separating the ends of said ring and operative to move them equally from their initial positions.

7. Apparatus for distorting a split ring comprising a freely movable clamp having a jaw provided with a narrow edge for engaging a portion of a ring and a jaw provided with a portion substantially wider than said narrow edge for pressing the ring against the narrow edge of the first jaw, means for locking said clamp against movement, and means diametrically opposite said clamp for separating the ends of said ring and operative to move them equally from their initial positions.

8. Apparatus for distorting a split ring comprising blocks movable toward and away from each other, members thereon receiving the ends of the ring, and means for causing relative movement of said blocks.

9. Apparatus for distorting a split ring comprising blocks receiving the ends of the ring, said blocks being movable to separate said ends in a direction tangential to the ring in the initial position thereof, and means for causing separation of said blocks.

10. Apparatus for distorting a split ring comprising a rod, blocks slidable thereon having means for receiving the ends of the ring, means for sliding said blocks simultaneously along said rod in opposite directions to separate the ends of the ring, and means for locking the blocks against movement.

11. Apparatus for distorting a split ring comprising a rod, a shaft oppositely threaded at both ends disposed in parallel relation to said rod, blocks slidable on said rod and having threaded openings receiving said shaft and projections for receiving the ends of the ring, and means whereby the shaft may be turned to cause said blocks to separate and distort the ring.

12. Apparatus for distorting a split ring comprising a rod, a shaft oppositely threaded at both ends disposed in parallel relation to said rod, blocks slidable on said rod and having threaded openings receiving said shaft, members on said blocks for receiving the ends of the ring, and a knurled collar centrally disposed on said shaft whereby the latter may be rotated, said blocks being recessed on their opposed sides to receive said collar when the members are in abutting position.

13. Apparatus for distorting a split ring comprising slidable blocks receiving the ends of the ring, means for separating said blocks to distort the ring, and means to prevent the ring from tipping while it is being distorted.

14. Apparatus for distorting a split ring comprising slidable blocks receiving the ends of the ring, means for separating said blocks to distort the ring, and means movable in the diametrical plane bisecting the split in the ring, as initially positioned with respect to the means engaging its ends, to prevent the ring from tipping while it is being distorted.

15. Apparatus for symmetrically expanding an open ring, comprising means movable to separate the ends of the ring, a slide movable perpendicularly to the path of movement of said means, means on said slide for supporting the ring on the side opposite the opening in said ring and at a point symmetrical with respect to the ends of the ring, and means on said slide whereby the ring may be accurately centered on its support.

16. Apparatus for symmetrically expanding an open ring, comprising means movable rectilinearly for separating the ends of an open ring, a slide movable perpendicularly to the path of movement of said means, a clamp thereon for gripping the ring at a point symmetrical with respect to its ends, there being graduations on said slide whereby the ring is accurately positioned in said clamp.

17. Apparatus for symmetrically expanding an open ring, comprising a base, means associated therewith movable oppositely along a predetermined path for separating the ends of an open ring, a slide on said base movable perpendicularly to said path at a point between said separating means, and a clamp thereon for gripping the ring at a point symmetrical with respect to its ends, there being a graduated scale on said slide whereby the ring is accurately positioned in said clamp.

18. In apparatus of the class described means for engaging and adjustably spreading the ends of an open ring, said means comprising parts movable in a predetermined path substantially in the plane of the ring, as initially positioned with respect to the means engaging its ends, a clamp for gripping a portion of the ring opposite the opening therein, and movable in a direction perpendicular to said path and also substantially in the plane of the ring, and an abutment movable in two dimensions in the plane of the ring to contact the latter.

19. In apparatus of the class described, means for engaging and adjustably spreading the ends of an open ring, a clamp for gripping a portion of the ring opposite the opening therein, movable in a direction perpendicular to a line connecting the ends of the ring, as initially positioned with respect to the means engaging its ends, a slide parallel to the direction of movement of said clamp, and an abutment member thereon to contact the ring at a point in a line parallel to said slide and tangent to said ring.

20. In apparatus of the class described, means for engaging and adjustably spreading the ends of an open ring, a clamp for gripping a portion of the ring opposite the opening therein, said clamp being movable in a direction substantially perpendicular to a line connecting the ends of the ring, as initially positioned with respect to the means engaging its ends, a slide parallel to the direction of movement of said clamp, and an abutment member thereon adjustable transversely thereof in the plane of the ring to contact the latter at a point in a line parallel to said slide and tangent to said ring.

21. Means for determining the contour of a distorted ring comprising means for holding a ring in a plane, a tracing point, means for supporting the tracing point perpendicularly relative to such plane, and means for pivoting said point with respect to said holding means about the center of said ring when placed upon the holding means.

22. Means for determining the contour of a distorted ring comprising means for holding the ring, a tracing point, a supporting arm therefor and means pivoting said arm on said holding means at the center of said ring when placed upon the holding means.

23. Means for determining the contour of a distorted ring comprising means for holding the ring, a tracing point, a supporting arm therefor, pivotally mounted on said holding means substantially at the center of said ring when placed upon the holding means, said arm being longitudinally adjustable radially of its pivoted axis.

24. Means for determining the extent of expansion of a distorted split ring comprising a base, means thereon for holding the distorted ring, in combination with a member movable in two directions in the plane of the ring when placed upon the holding means, adapted to be brought in contact with the ring at one end of the diameter perpendicular to the diametrical plane bisecting the split in the ring, whereby said member may act as an abutment for a gage for measuring accurately across the ring.

25. Apparatus for making templates for mandrels for piston ring followers comprising means for symmetrically distorting a split ring, and a support adjacent thereto for supporting template stock in juxtaposed parallelism to the ring.

26. Apparatus for making templates for mandrels for piston ring followers comprising means for symmetrically distorting a split ring, a support adjacent thereto for supporting template stock, in juxtaposed parallelism to the ring during distortion of the latter and means associated with the support for determining the center of the ring after it has been distorted.

27. Apparatus for making templates for mandrels for piston rings comprising movable means for distorting an open ring, a support for template stock adjacent said means, and an additional movable support for said stock, said supports holding said template stock in juxtaposed parallelism to said split ring during distortion of the latter.

28. Apparatus for making templates for mandrels for piston rings comprising a base, means thereon movable along a rectilinear path for distorting an open ring, a support for template stock adjacent said means, a slide perpendicular to the path of movement of said means, and means on said slide serving as an additional support for said stock, said supports holding said template stock in juxtaposed parallelism to said split ring during distortion of the latter.

29. Apparatus for making templates for mandrels for piston rings comprising a base, means thereon movable in a predetermined path for distorting an open ring, a support for template stock adjacent said means, and a slide perpendicular to the path of movement of said means, said slide having a recess for the reception of one side of the template stock whereby the latter is additionally supported, and means for locking said slide against movement.

30. In apparatus of the class described, a base, means for engaging and adjustably spreading the ends of an open ring, a clamp for gripping a portion of the ring, said clamp being movable in a direction substantially perpendicular to a line connecting the ends of the ring, as defined when said ends are engaged by the spreading means, and movable means disposed in parallelism to the path of said clamp for determining the center of the ring.

31. In apparatus of the class described, a base, means for engaging and adjustably spreading the ends of an open ring, a clamp for gripping a portion of the ring, said clamp being movable in a direction substantially perpendicular to a line connecting the ends of the ring, as defined when said ends are engaged by the spreading means, a slide parallel to the path of said clamp, and a pivoted member thereon for determining the center of the ring.

32. In apparatus of the class described, a base, means for engaging and adjustably spreading the ends of an open ring, a clamp for gripping a portion of the ring, the clamp being movable in a direction substantially perpendicular to a line connecting the ends of the ring, as defined when said ends are engaged by the spreading means, a slide parallel to the path of said clamp, an arm pivoted thereto for determining the center of the ring, and means including a rotatable rod for locking said slide against movement.

33. Apparatus for making templates for piston ring followers comprising a base, a clamp mounted thereon for holding an open ring, means for spreading the ends of the ring, and indicating means mounted upon the base and movable into and out of a position to indicate the center of the ring.

34. Apparatus for making templates for piston ring followers comprising a base, supports thereon for an open ring, certain of said supports being operable to expand the ring whereupon said means may be again moved into position to indicate the center of the expanded ring and means freely movable over said supports and ring to indicate the center of the ring.

35. In apparatus of the class described, supports for an open ring, mounted upon a suitable base, a member adjustably mounted on said base relative to said supports, locking means for said member, and an arm pivoted to said member to swing over the ring placed on said supports, whereby said arm may be locked in position to indicate a spot within the ring, then swung out of the way, and again moved back when desired to indicate exactly the same spot.

36. Apparatus for distorting a split ring comprising blocks movable towards and away from each other, means moving therewith receiving the ends of a ring, and means for causing simultaneous movements of said blocks in opposite directions at equal rates.

Signed by me at Boston, Massachusetts, this twenty-fifth day of October, 1921.

LEWIS C. MARSHALL.